US011732528B2

(12) United States Patent
Martinez et al.

(10) Patent No.: US 11,732,528 B2
(45) Date of Patent: Aug. 22, 2023

(54) DOOR FASTENER RETAINING ASSEMBLY, SYSTEM, AND METHOD

(71) Applicant: Toshiba International Corporation, Houston, TX (US)

(72) Inventors: Enrique Martinez, Cypress, TX (US); Walter Campos, Houston, TX (US)

(73) Assignee: TOSHIBA INTERNATIONAL CORPORATION, Houston, TX (US)

(*) Notice: Subject to any disclaimer, the term of this patent is extended or adjusted under 35 U.S.C. 154(b) by 65 days.

(21) Appl. No.: 17/362,224

(22) Filed: Jun. 29, 2021

(65) Prior Publication Data

US 2022/0412154 A1 Dec. 29, 2022

(51) Int. Cl.
   E06B 3/72 (2006.01)
   H02B 1/38 (2006.01)
   H02B 13/025 (2006.01)

(52) U.S. Cl.
   CPC ............... E06B 3/72 (2013.01); H02B 1/38 (2013.01); H02B 13/025 (2013.01)

(58) Field of Classification Search
   CPC ........ E06B 3/72; E06B 1/6015; E06B 1/6069; E06B 1/56; E06B 1/6076; E04F 21/0015; H02B 1/38; H02B 13/025
   USPC ..... 52/213, 214; 312/216, 222; 49/505, 395, 49/316–320
   See application file for complete search history.

(56) References Cited

U.S. PATENT DOCUMENTS

| 2,088,909 | A | * | 8/1937 | Jaubert | E06B 5/14 |
| | | | | | 277/921 |
| RE22,673 | E | * | 9/1945 | Tinnerman | F16B 37/041 |
| | | | | | 411/84 |
| 2,753,020 | A | * | 7/1956 | Ware, Jr. | E06B 7/18 |
| | | | | | 49/318 |
| 2,805,451 | A | * | 9/1957 | Evans | E06B 3/40 |
| | | | | | 49/318 |
| 3,987,596 | A | * | 10/1976 | Wolf | B65D 90/54 |
| | | | | | 49/40 |
| 5,239,781 | A | * | 8/1993 | Napierkowski | A61L 2/07 |
| | | | | | 52/630 |
| 5,439,282 | A | * | 8/1995 | Probst | H02B 1/38 |
| | | | | | 49/70 |
| 5,927,019 | A | * | 7/1999 | Ichida | E06B 5/00 |
| | | | | | 49/501 |
| 6,106,035 | A | * | 8/2000 | Hetherington | E05C 5/04 |
| | | | | | 411/433 |
| 6,722,083 | B2 | * | 4/2004 | Herrmann | A47F 3/0434 |
| | | | | | 52/204.63 |
| 7,841,048 | B2 | * | 11/2010 | Tsai | E05D 15/063 |
| | | | | | 16/97 |
| 7,871,137 | B2 | * | 1/2011 | Schulz | H02B 1/38 |
| | | | | | 312/296 |

(Continued)

FOREIGN PATENT DOCUMENTS

CN 203967540 U * 11/2014

*Primary Examiner* — Brent W Herring
(74) *Attorney, Agent, or Firm* — Baker Botts L.L.P.

(57) ABSTRACT

A system including a door, a fastener, and a fastener retaining assembly is provided. The fastener is extending at least partially through an aperture in the door. The fastener retaining assembly includes a bracket and a retainer washer. The fastener retaining assembly is attached to the door and retains the fastener to the door. The retainer washer is disposed around the fastener and disposed between the bracket and the door.

17 Claims, 9 Drawing Sheets

(56) References Cited

U.S. PATENT DOCUMENTS

| | | | |
|---|---|---|---|
| 8,407,941 B2* | 4/2013 | Chang | E05F 11/04 |
| | | | 49/425 |
| 8,733,853 B2* | 5/2014 | Gingrich | H02B 13/025 |
| | | | 312/216 |
| 8,984,812 B2* | 3/2015 | Karallus | E05C 3/14 |
| | | | 49/319 |
| 9,297,181 B2* | 3/2016 | Gasparetto | E05B 1/00 |
| 9,769,946 B2* | 9/2017 | Bhalla | H05K 5/068 |
| 11,242,703 B2* | 2/2022 | Sims | E05C 9/063 |
| 2007/0151163 A1* | 7/2007 | Thielmann | E06B 7/18 |
| | | | 49/394 |
| 2008/0148642 A1* | 6/2008 | Mathieu | E05C 9/1875 |
| | | | 49/395 |
| 2009/0000204 A1* | 1/2009 | Chang | E05D 15/0634 |
| | | | 49/425 |
| 2014/0097734 A1* | 4/2014 | Gingrich | H02B 1/38 |
| | | | 312/326 |
| 2016/0177603 A1* | 6/2016 | Sims | E05C 9/063 |
| | | | 292/101 |
| 2017/0027072 A1* | 1/2017 | Bhalla | H02B 1/306 |
| 2017/0048999 A1* | 2/2017 | Abee | H02B 1/28 |
| 2019/0360248 A1* | 11/2019 | Summers | E05D 15/48 |
| 2020/0157877 A1* | 5/2020 | McKinnon | E06B 7/2316 |
| 2020/0308875 A1* | 10/2020 | Nguyen | E05B 65/001 |

* cited by examiner

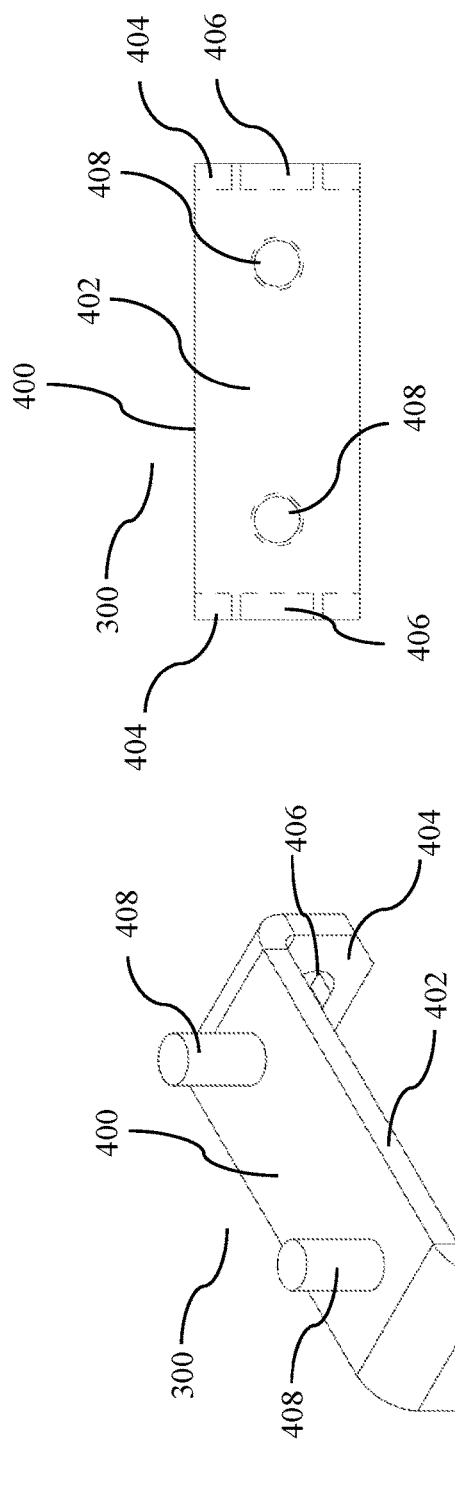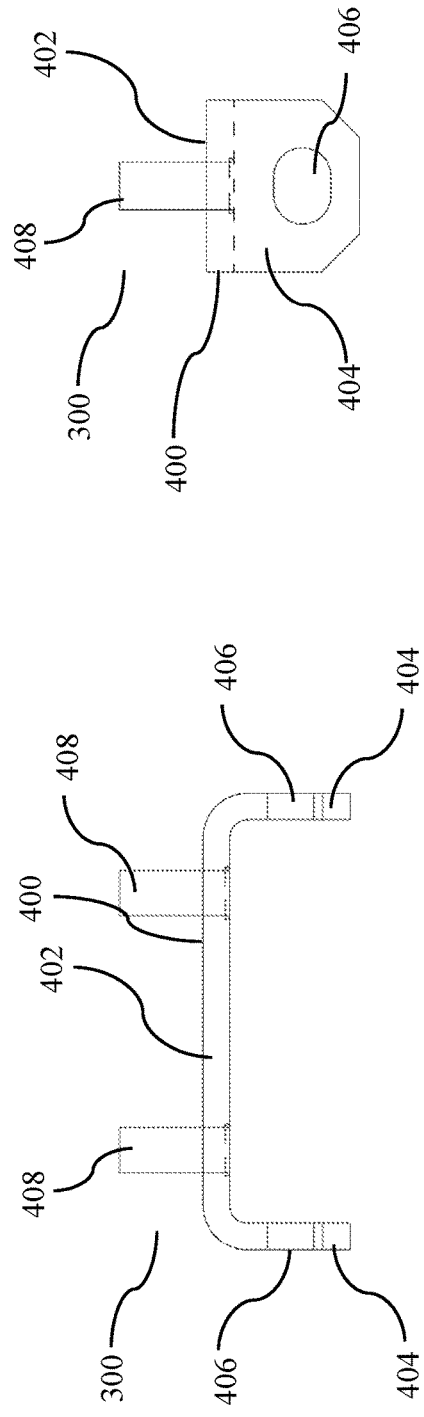

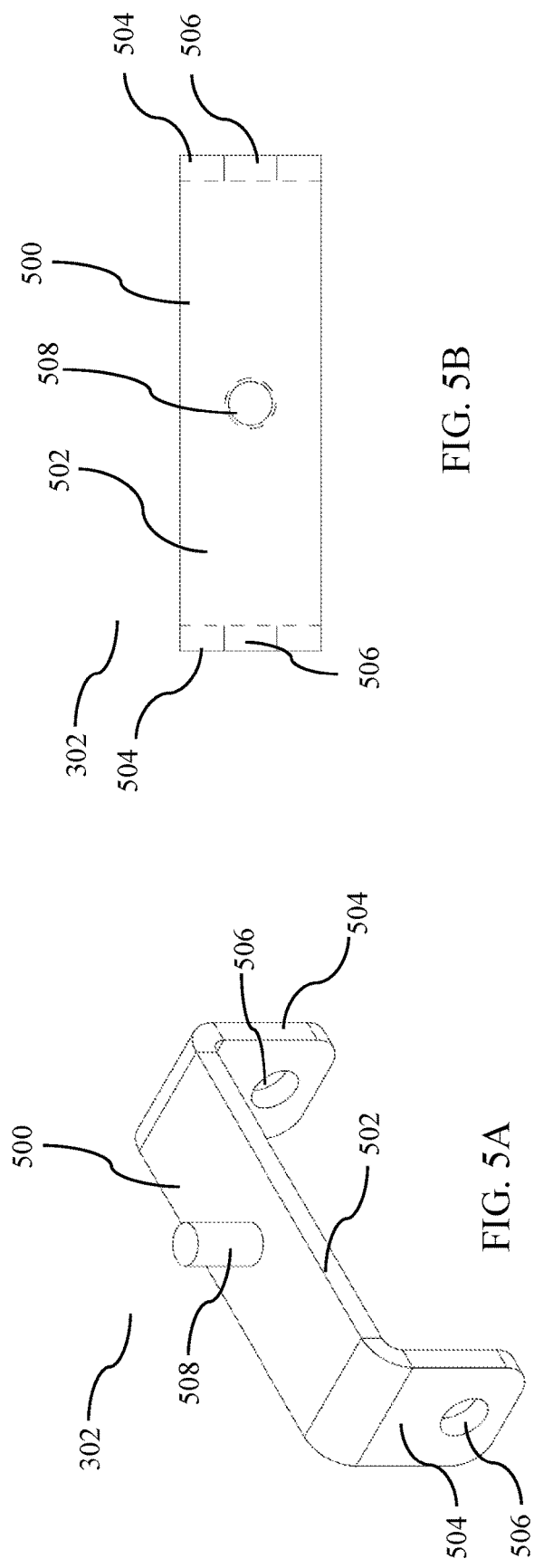
FIG. 5A
FIG. 5B
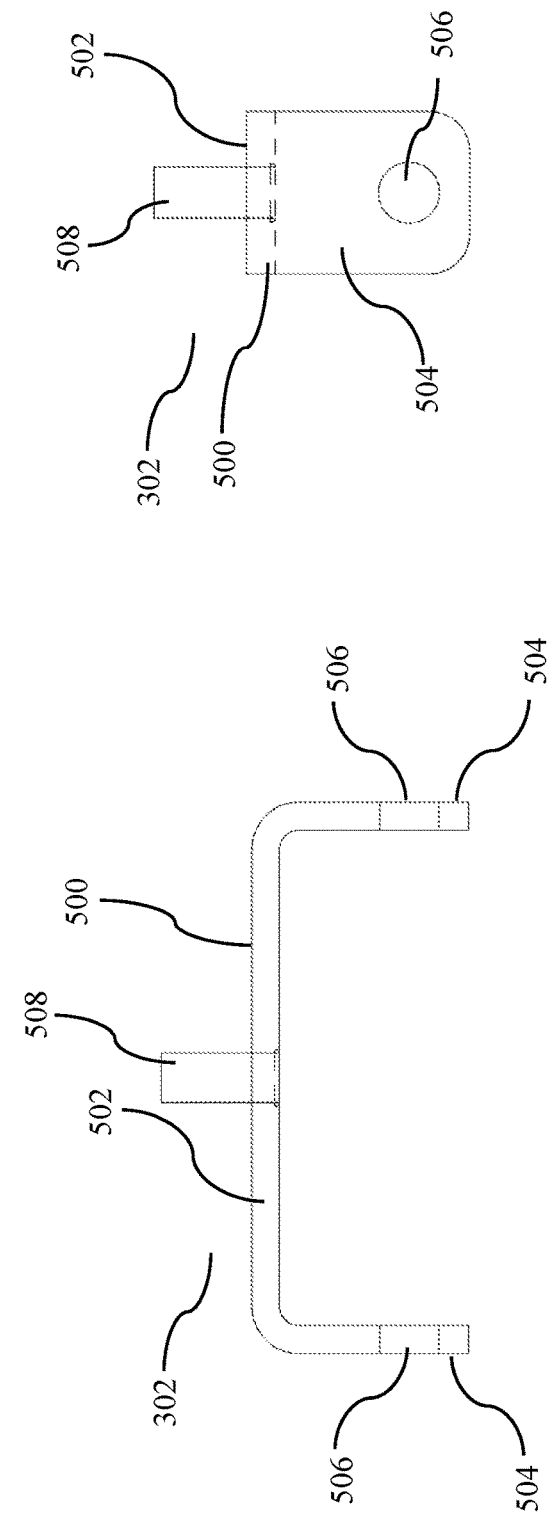
FIG. 5C
FIG. 5D

DOOR FASTENER RETAINING ASSEMBLY, SYSTEM, AND METHOD

TECHNICAL FIELD

Embodiments of the present disclosure relate to door fastening systems and, more particularly, to a door fastener retaining assembly, system, and method.

BACKGROUND

Door fasteners are used in a wide variety of contexts in which a door (which may be a hinged door or a removable cover) is repeatedly opened and closed. Door fasteners may be used to secure the door against a mounting surface when the door is closed. Such door fasteners may in some instances include one or more bolts that are extended into locking engagement with a corresponding nut on an opposite side of the mounting surface onto which the door is closed. For doors that will be repeatedly opened, closed, and secured via fasteners, it may be desirable to retain the door fastening hardware against the door even while the door is not fastened (e.g., while the door is open). However, door fastener retaining equipment does not allow for a door to close completely flush against the mounting surface. Some doors are required to close flush against their mounting surfaces to provide protection from the effects of an internal arc fault.

It is now recognized that a need exists for a door fastener retaining assembly that can be used to retain door fastening hardware on a door that must sit flush against the mounting surface when closed.

SUMMARY

In accordance with an aspect of the present disclosure, a system includes a door, a fastener extending at least partially through an aperture in the door, and a fastener retaining assembly. The fastener retaining assembly includes a bracket and a retainer washer. The fastener retaining assembly is attached to the door and retains the fastener to the door, and the retainer washer is disposed around the fastener and disposed between the bracket and the door.

In accordance with another aspect of the present disclosure, an assembly includes a fastener and a fastener retaining assembly. The fastener retaining assembly includes a bracket with an aperture formed therethrough, and a retainer washer. The fastener extends through the aperture in the bracket, and the bracket includes an attachment feature configured to mount the fastener retaining assembly to a structure. The retainer washer is disposed around the fastener, and the retainer washer is disposed proximate the bracket.

In accordance with another aspect of the present disclosure, a method includes receiving a fastener into a fastener retaining assembly. The fastener retaining assembly includes a bracket and a retainer washer. The method also includes securing the door to a door frame via the fastener, and retaining the fastener to the door via the fastener assembly attached to the door.

BRIEF DESCRIPTION OF THE DRAWINGS

For a more complete understanding of the present disclosure and its features and advantages, reference is now made to the following description, taken in conjunction with the accompanying drawings, in which:

FIGS. 4A, 4B, 4C, and 4D are perspective, top, front, and side views, respectively, of a first hinge component used in the system of FIG. 1, in accordance with an embodiment of the present disclosure;

FIGS. 5A, 5B, 5C, and 5D are perspective, top, front, and side views, respectively, of a second hinge component used in the system of FIG. 1, in accordance with an embodiment of the present disclosure;

DETAILED DESCRIPTION

Figure 1:
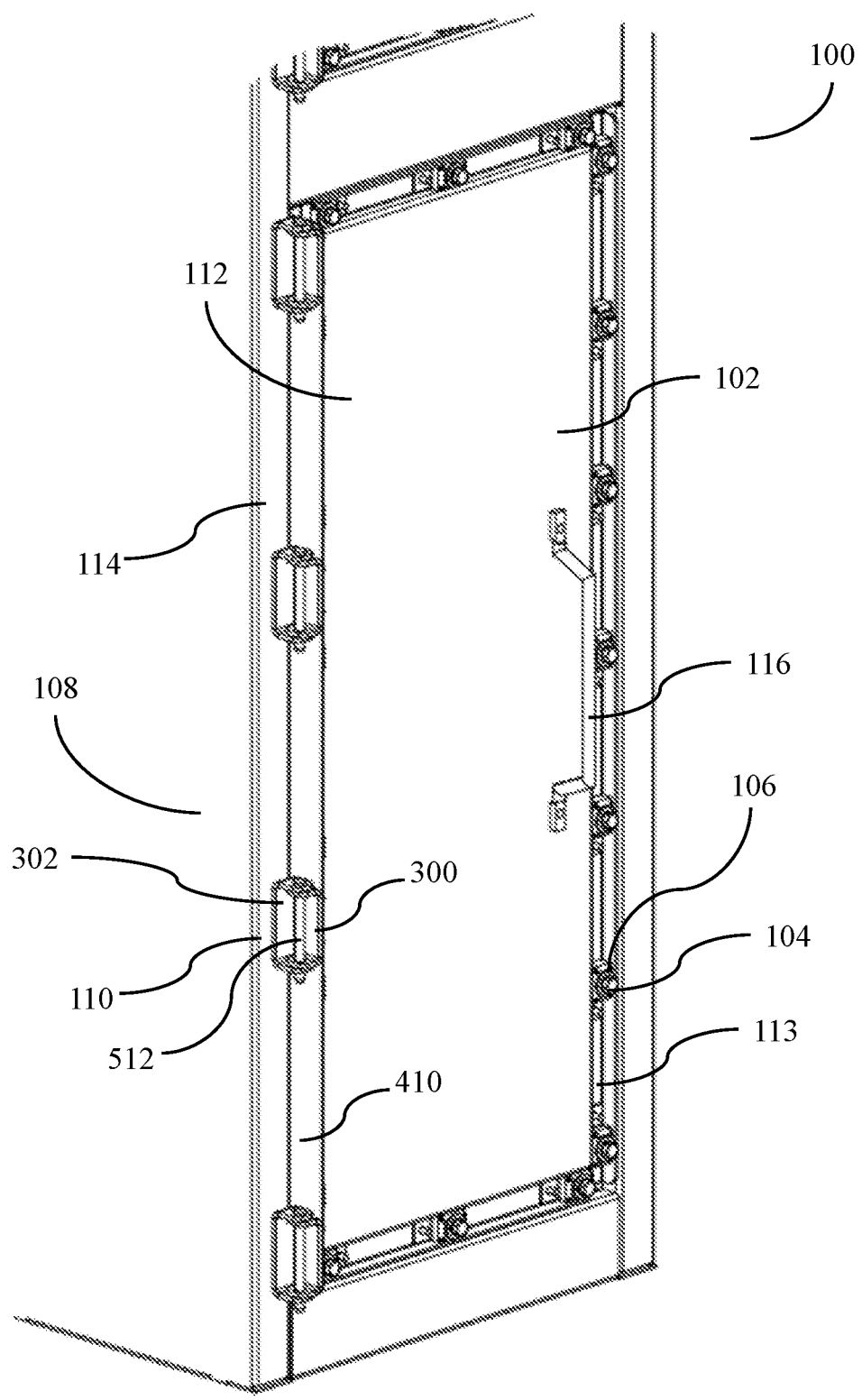
FIG. 1 is a perspective view of a hinge door to a power electronics cabinet and having fastener retaining assemblies, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Disclosed embodiments are directed to a door fastener retaining assembly and a system and method for using the same. The door fastener retaining assembly provides a simple method for retaining door fastening hardware to doors that are designed to sit flush against the door's mounting surface when the door is closed. The door fastener retaining assembly includes a retainer washer and a specially designed bracket. The retainer washer is disposed between the bracket and the door, and the door when closed is disposed between the retainer washer and the mounting surface of the door. A fastener extends through the bracket, the retainer washer, and at least a portion of the door throughout its use. The fastener can be extended fully through the door and the mounting surface to interface with an engagement feature on the opposite side of the mounting surface from the door to secure the door in the closed position. The fastener can be retracted from the engagement feature and mounting surface, thereby enabling the door to be opened, and the retainer washer retains the fastener with the door while the door is opened and closed.

Retainer washers are commonly used to retain fastening hardware on covers. However, the retainer washers are typically installed on the inside of the cover so that the retainer washer takes up space between the cover and its mounting surface. As such, this type of assembly involving a retainer washer cannot be used for doors that require the door surface to be flush with the mounting surface. The disclosed embodiments address the shortcomings of existing retainer washer assemblies.

The disclosed embodiments provide a fastener retaining assembly that can be used to retain fastening hardware to a door having a surface that is flush with the door's mounting surface. This is the case for doors (including hinged doors or covers) that sit on the same surface as their door frame or mounting surface to meet product standards such as standards for leak prevention. When the surface of the door has to directly contact the mounting surface, there is no space for a retainer washer between the door and the mounting surface. The disclosed fastener retaining assembly, system, and method enable a retainer washer to be used for retaining a fastener on the door in door assemblies in which the door, when closed, sits flush with the mounting surface. It should be noted, however, that the disclosed fastener retaining assembly, system, and method may be utilized with any door designed to be opened or closed over a mounting surface, regardless of whether the door sits flush against the mounting surface when closed.

Figure 2:
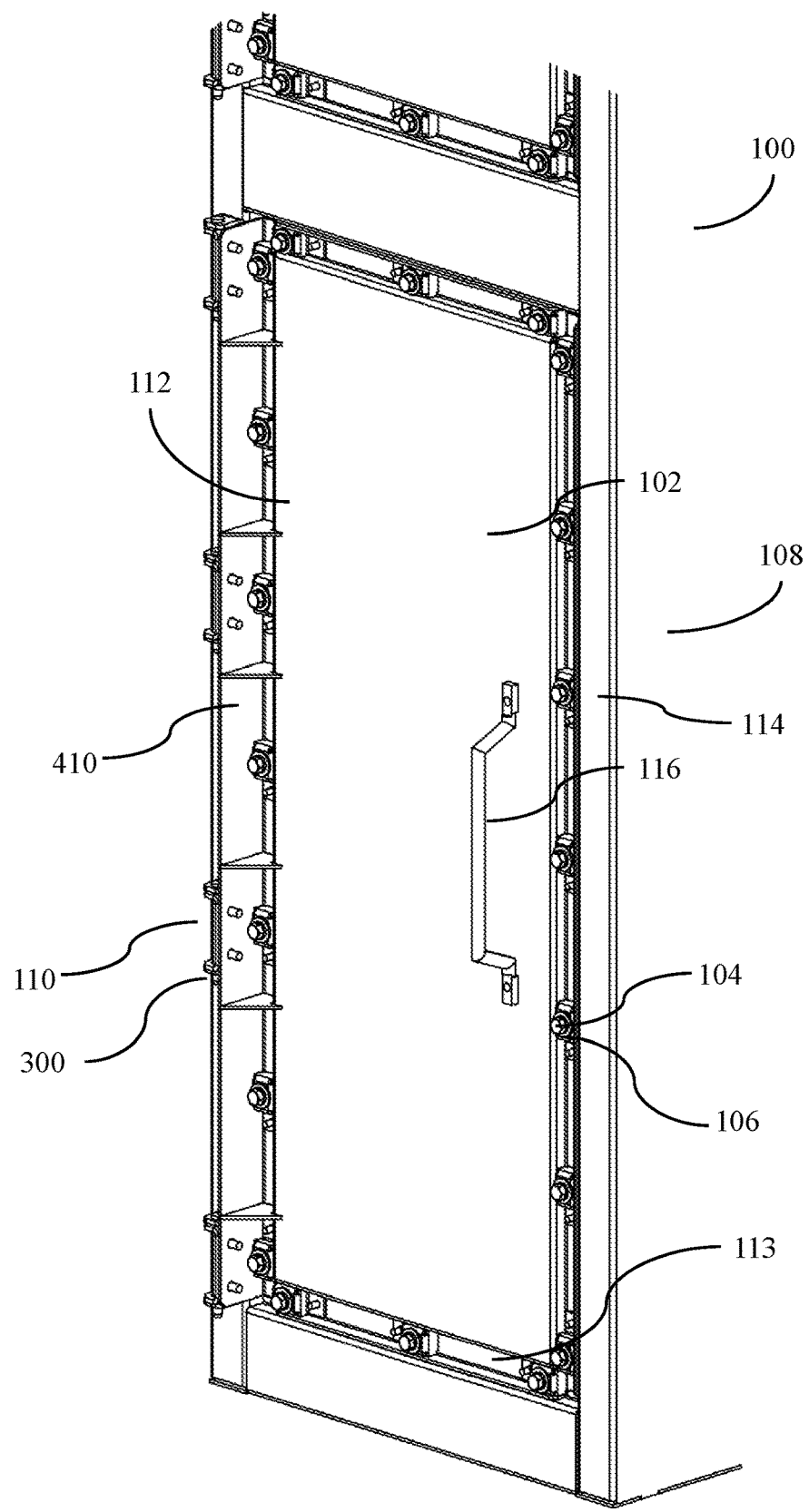
FIG. 2 is another perspective view of the door of FIG. 1, in accordance with an embodiment of the present disclosure.

Turning now to the drawings, FIGS. 1 and 2 illustrate an example system 100 comprising a door 102 equipped with at least one fastener 104 and at least one fastener retaining assembly 106 in accordance with aspects of the present disclosure. In general, the system 100 comprises a door 102, a fastener 104, and a fastener retaining assembly 106. The fastener 104 may extend at least partially through an aperture in the door 102. As discussed further below, the fastener retaining assembly 106 generally comprises a bracket and a retainer washer, the retainer washer disposed around the fastener 104 and disposed between the bracket and the door 102. The fastener retaining assembly 106 is attached to the door 102 and retains the fastener 104 to the door 102.

The system 100 may include a structure 108 onto which the door 102 is closed. In an example, the door 102 may be a hinged door rotatably attached to the structure 108 via a hinge 110, as illustrated. In another example, the door 102 may be a removable cover that can be selectively removed from the structure 108. In such instances, the door 102 may not feature a hinge. In general, the door 102 is selectively moveable with respect to the structure 108 to provide an access point to an interior of the structure 108.

The structure 108 may be any desired structure that utilizes a door 102. For example, the structure 108 may be a wall or an enclosure. In some embodiments, the structure 108 may be an enclosure designed to house components therein. In some embodiments, the structure 108 may be an enclosure designed to prevent ingress or egress of fluid relative to the interior of the enclosure. In some embodiments, the structure 108 may be an enclosure designed to be arc resistant. In such instances, the door 102, at least one fastener 104, and at least one fastener assembly 106 may be designed to prevent effects from an arc inside the structure 108 from breaching the structure 108, for example, by blasting open the door 102. However, the disclosed at least one fastener 104 and at least one fastener assembly 106 may be similarly used to fasten doors 102 with respect to any other type of structures 108, not just those designed to contain an arc event.

In an embodiment, the structure 108 may be a power electronics cabinet. The structure 108 may be an enclosure for various power electronics, which may form part of, for example, a medium-voltage control center or adjustable speed drive. Power electronics enclosed in the structure 108 may be used for various other functions as well. In some embodiments, the structure 108 may include two or more doors 102 for accessing the interior thereof. For example, two doors 102 on the same structure 108 may open into separate compartments, each compartment enclosing different equipment (e.g., power electronics). In other embodiments, multiple doors 102 may open into the same compartment within the structure 108. As shown, the door 102 may be generally rectangular in shape. The door 102 may have a flat face 112.

It should be understood by those of ordinary skill in the art that any desired number of doors 102 may be used on a structure 108 such as the enclosure shown in FIGS. 1 and 2, and the disclosure is not limited to structures 108 featuring any exact number of doors 102 formed therein. Other embodiments of structures 108 utilizing the disclosed door fastener retaining system may include, for example, one, two, three, four, five, six, seven, eight, or more doors 102.

Regardless of the number of doors 102 and/or compartments within the structure 108, each door 102 includes a door fastener retaining system, in accordance with embodiments of the present disclosure. The components of the door fastener retaining system generally include the at least one fastener 104 and the at least one fastener retaining assembly 106. The fastener 104 and fastener retaining assembly 106 may be located on an outward facing portion (e.g., face 112) of the door 102. That is, the fastener 104 and fastener retaining assembly 106 may be located on a side of the door 102 facing away from the structure 108. In an embodiment, the face 112 may include a recessed portion 113 of the door 102 located around the perimeter of the door 102 and recessed slightly inward from one or more other portions of the face 112 of the door 102. The recessed portion 113 may receive the one or more fasteners 104 and fastener retaining assemblies 106.

Each fastener 104 may be received into a corresponding fastener assembly 106. The fastener assembly 106 generally includes a bracket and a retainer washer. The fastener 104 is used to selectively secure the door 102 to a mounting surface as described below, and the fastener retaining assembly 106 attached to the door 102 is used to retain the fastener 104 to the door 102.

Figure 9B:
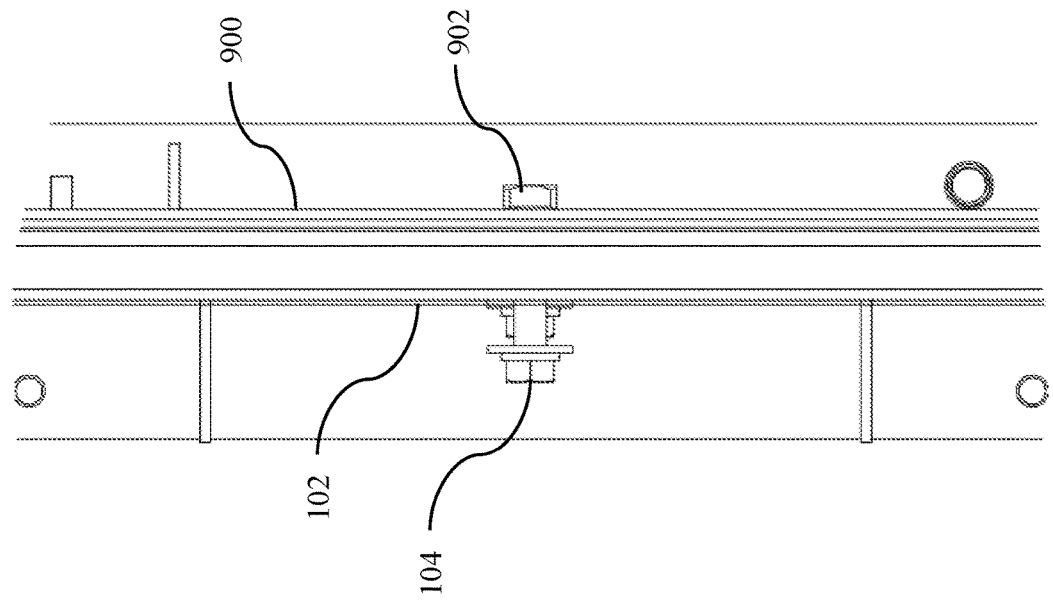
FIGS. 9A and 9B are side cutaway views of a fastener and fastener retaining assembly in use on a door, in accordance with an embodiment of the present disclosure.

In FIGS. 1 and 2, the door 102 is shown in a closed position. In this closed position, the door blocks an opening formed in the structure 108. The structure 108 may comprise a mounting surface 114 to which the door 102 is mounted when the door 102 is in the closed position. The at least one fastener 104, when activated, generally fastens and/or secures the closed door 102 to the mounting surface 114. The mounting surface 114 may be a generally flat planar surface of the structure 108 surrounding the opening in the structure 108 that is selectively covered by the door 102. As such, the mounting surface 114 acts as a door frame (e.g., 900 in FIGS. 9A and 9B) for the door 102. The door 102 may have a larger area than the opening over which the door 102 is closed. As such, the perimeter edges of the door 102 may overlap the opening in the structure 108. When closed, a flat face (not shown) of the door 102 on an inside of the door 102 (i.e., opposite the face 112) may contact and interface directly (in direct contact) with the mounting surface 114.

In an example, the door 102 may include an outward facing door handle 116, as shown in FIGS. 1 and 2. In some embodiments, the door 102 may include multiple such handles 116 extending from the face 112 of the door 102.

The door 102 may be opened and closed relative to the structure 108 via its connection at the hinge 110. When the door 102 is closed over the opening in the structure 108, the door 102 may then be locked via activation of the one or more fasteners, which interface with the mounting surface 114 of the structure 108. An operator may turn (e.g., manually or using a tool) the fastener(s) 104 to actuate the fastening system when the door 102 is in a closed position. When the door 102 is to be opened, the operator may turn the fastener(s) 104 in an opposite direction to disengage the fastener(s) 104 from the mounting surface 114 when the door is in the closed position. From there, the door 102 may be opened by either rotation with respect to the structure 108 via the hinge 110 or manual removal of the door 102 (as a cover) from the structure 108. As the door 102 is opened, the at least one fastener retaining assembly 106 retains the at least one fastener 104 to the door 102.

At least one hinge 110 generally couples the door 102 to the mounting surface 114 of the structure 108. In the illustrated embodiment, the door 102 comprises multiple individual hinge assemblies 110 coupled between the door 102 and the mounting surface 114 of the structure 108. An embodiment of the different components in each hinge assembly 110 is described in detail below with reference to FIGS. 4A-5D. In some embodiments, the door 102 may be rotatably coupled to the structure 108 via any desired number of (e.g., one, two, three, four, five, six, seven, eight, or more) hinge assemblies 110 disposed along the same side of the door 102.

As illustrated, the system 100 may include multiple fasteners 104 and associated fastener retaining assemblies 106 on the same door 102. The system 100 may include a plurality of fasteners 104, each of the plurality of fasteners 104 extending at least partially through a corresponding one of a plurality of apertures in the door 102, and a plurality of fastener retaining assemblies 106, each of the plurality of fastener retaining assemblies 106 being attached to the door 102 and retaining a corresponding one of the plurality of fasteners 104 to the door 102.

As illustrated, each of the fastener 104/fastener retaining assembly 106 pairs may be disposed along or proximate an outer perimeter of the face 112 of the door 102. That way, the fastener 104/fastener retaining assembly 106 pairs are able to selectively secure the door 102 against the mounting structure 114 to which the opposite side of the door 102 is contacted. When multiple fasteners 104 and fastener retaining assemblies 106 are present on the door 102, the fasteners 104 and their associated fastener retaining assemblies 106 may be approximately evenly spaced about the perimeter of the door 102. In an embodiment where the door 102 has a hinge 110, at least one fastener 104 and its associated fastener retaining assembly 106 may be disposed along the edge of the door 102 nearest the hinge 110, as shown in FIG. 2. In an embodiment where the door 102 is rectangular in shape, at least one fastener 104 and its associate fastener retaining assembly 106 may be disposed along each edge of the four edges of the door 102. The door 102 may be equipped with any desired number of fasteners 104 and their associated fastener retaining assemblies 106 from as few as one to as many as 50 or more. In the illustrated embodiment, the door 102 has twenty fasteners 104 and twenty corresponding fastener retaining assemblies 106.

In an embodiment, the fastener hardware may be detachable from the door 102. For example, each fastener retaining assembly 106 may be removably attached to the door 102 such that the fastener retaining assembly 106 is selectively removable from the door 102. Each fastener retaining assembly 106 may be removable together with the associated fastener 104 and any other fastener hardware (as one piece) from the door 102. This allows removal of the fastener 104 together with the fastener retaining assembly 106 from the door 102 such that the entire fastener assembly may be replaceable in the event that the fastener assembly is compromised.

Figure 3:
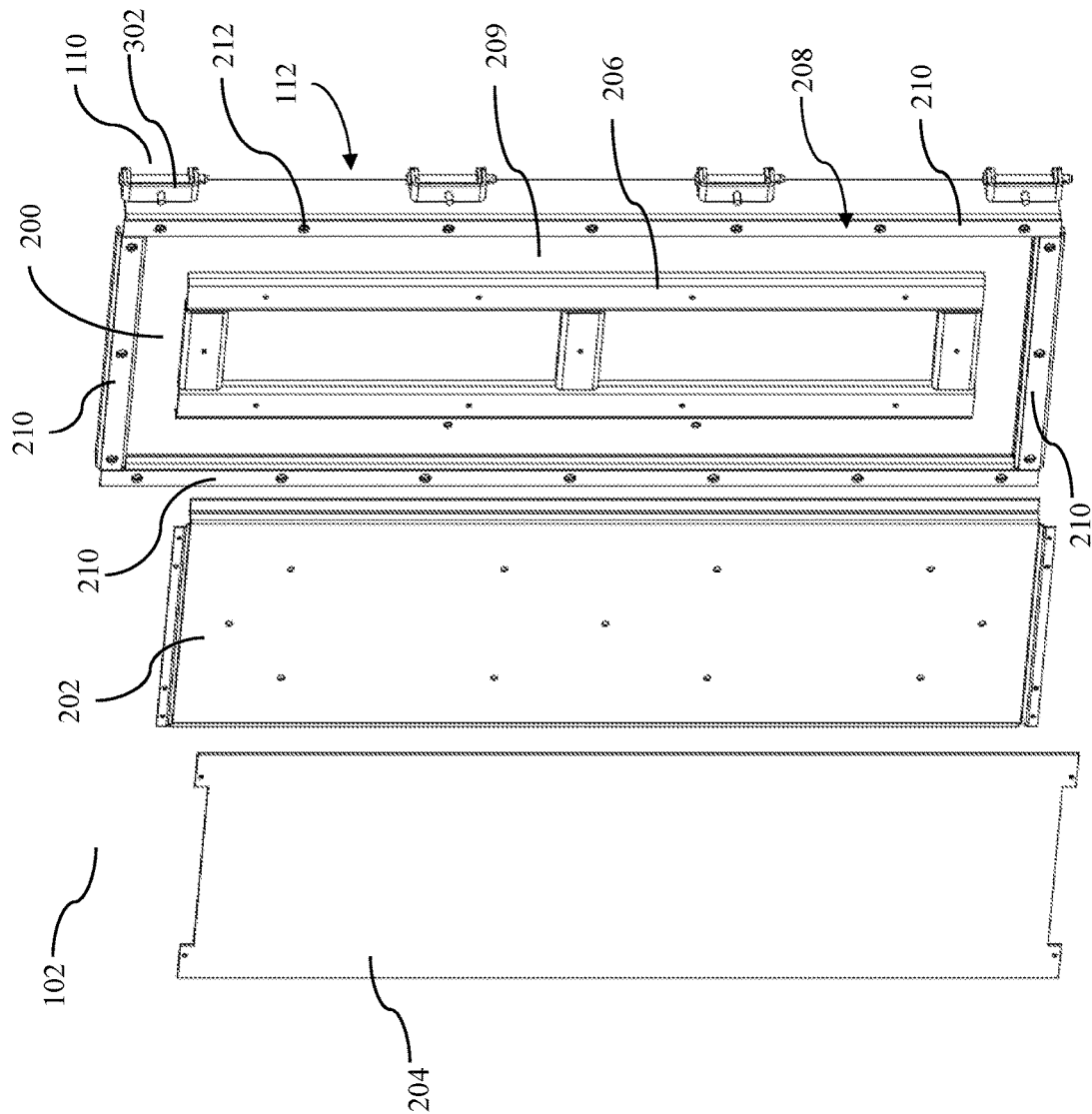
FIG. 3 is an exploded perspective view of a back side of the door of FIG. 1, in accordance with an embodiment of the present disclosure.

FIG. 3 is an exploded view of a door assembly including the door 102 of FIGS. 1 and 2, in accordance with certain aspects of the present disclosure. The door assembly of FIG. 3 also includes a gasket 208 and the hinge assemblies 110 that may be used to rotatably attach the door 102 to the mounting structure (not shown). As illustrated, the door 102 may include multiple sections that are stacked against each other and secured together to form the back side of the door 102 opposite the face 112. The door 102 may include three sections stacked against each other. The three sections may include a main section 200, an intermediate section 202, and an inner cover 204.

The main section 200 of the door 102 may include the face 112 of the door 102, which is oriented away from the interior of the structure to which the door is coupled. The main section 200 may be larger in area than the intermediate section 202 and the inner cover 204 of the door 102. The main section 200 may include an additional structure support 206 that projects inwardly away from the outer face 112 of the door 102. The additional structure support 206 may be located toward the middle of the surface on the back side of the main section 200. The intermediate section 202 may be disposed over and coupled to the additional structure support 206 on the back side of the main section 200. The intermediate section 202 may be coupled to the additional structure support 206 of the main section 200 using any desired coupling technique including, but not limited to, one or more fasteners, press fit, contact fit, welding, or combinations thereof. The inner cover 204 may provide a smooth surface to the back side of the door 102 so that the door 102 can easily close against the mounting surface. The inner cover 204 may be coupled to a face of the intermediate section 202 facing away from the main section 200. As such, the intermediate section 202 may be sandwiched between the main section 200 and the inner cover 204 of the door 102. The inner cover 204 may be coupled to the intermediate section 202 using any desired coupling technique including, but not limited to, one or more fasteners, press fit, contact fit, or combinations thereof. In an embodiment, the main section 200, intermediate section 202, and inner cover 204 may be made from sheet metal, sheet metal, and insulated material, respectively.

As will be appreciated by a person of ordinary skill in the art, other physical arrangements of one or more components may be used to form a door 102 on which one or more fasteners may be retained using the disclosed fastener retaining assembly.

In addition to the door 102, the door assembly may include a gasket 208 on an inward facing side of the door 102 and configured to contact and seal against the mounting surface of the structure to which the door is applied. The gasket 208 may be disposed on a face 209 of the door 102 opposite the face 112. The gasket may be disposed along a periphery of the face 209 of the door 102. As illustrated, the gasket 208 may include one or more strips 210 of material that are applied along the perimeter edges of the door 102 on the opposite face 209 of the door 102 from the face 112. The gasket 208 may be positioned along the edges of the door 102 that overlap with and will therefore come into direct contact with the mounting surface surrounding the opening in the structure when the door 102 is closed. The gasket 208 may be made from silicon, elastomer, neoprene, or other materials.

The gasket 208 may include apertures 212 formed therethrough at one or more locations along the length of the gasket 208. The apertures 212 in the gasket 208 may each be aligned with a corresponding aperture extending through the door 102 to receive the fastener (e.g., 104 of FIGS. 1 and 2) therethrough. The gasket 208 therefore may have an aperture 212 aligned with the aperture in the door 102, wherein the fastener (e.g., 104 of FIGS. 1 and 2) extends at least partially through the aperture 212 in the gasket 208. The apertures 212, as illustrated, may be located in a center of the gasket 208. Specifically, each aperture 212 may be located at a central location of the gasket 208 taken in a direction of a width of the individual gasket strip 210. Positioning the fasteners (e.g., 104 of FIGS. 1 and 2) through the center of each portion of the gasket 208 may provide an even seal between the door 102 and the mounting surface via the gasket 208. The door 102 is designed to close such that the inner side of the door 102 is flush with the mounting surface (e.g., 114 of FIGS. 1 and 2) to compress the gasket 208 between the door 102 and the mounting surface. Thus, the gasket 208 may be disposed between the door 102 and the mounting surface to seal a periphery of the door 102 when the door 102 is secured to the mounting surface via one or more fasteners.

The one or more hinge assemblies 110 are disposed along the outwardly facing face 112 of the door 102 to enable even sealing of the gasket 208 on the inner face 209 of the door 102. The gasket 208 shown in FIG. 3 provides a relatively large contact area between the door 102 and the mounting surface to which the door 102 is to be secured. This enables the door 102 to more effectively seal against pressure differentials, fluid ingress/egress, arc events, explosions, and other events happening on one side or the other of the door 102.

Each hinge assembly 110 may be specially designed to provide even sealing via the gasket 208. For example, each hinge assembly 110 may be a slotted hinge assembly having two parts, a first hinge component 300 attached directly to the door 102 and a second hinge component 302 attached directly to the structure (e.g., 108 of FIGS. 1 and 2) to which the door 102 is coupled. FIGS. 4A-5D provide detailed views of these two components 300/302 of the hinge assembly 110 of FIGS. 1-3. FIGS. 4A-4D illustrate the first hinge component 300, while FIGS. 5A-5D illustrate the second hinge component 302.

The first hinge component 300 of FIGS. 4A-4D may include a U-shaped body 400 having an elongated planar middle 402 and two planar tabs 404 extending from opposite ends of the planar middle 402. The tabs 404 are both oriented in parallel planes to each other and oriented 90 degrees from the planar middle 402. The planar tabs 404 may each have an aperture 406 formed therethrough. The apertures 406 are aligned with one another in a direction parallel to the length of the planar middle 402. As illustrated, the apertures 406 may be elliptical or oval in shape. In other embodiments, the apertures 406 may be circular or any other desired shape that enables a rod or similar mechanical linkage to extend therethrough. As illustrated, the planar middle 402 may include one or more fasteners 408 (e.g., studs) extending therefrom to enable coupling of the first hinge component 300 to the door (e.g., 102 of FIGS. 1-3). In the illustrated embodiment, the first hinge component 300 has two fasteners 408, although other numbers and arrangements of fasteners may be used. As illustrated, the fasteners 408 may extend from the planar middle 402 in a direction opposite of the direction in which the planar tabs 404 extend from the planar middle 402. The planar middle 402 of the first hinge component 300 may be disposed in direct engagement with a flat surface on an outside of the door (e.g., 102 of FIGS. 1 and 2) via the fastener(s) 408 or using any other desired coupling method. The first hinge component 300 may be coupled to a surface 410 (shown in FIGS. 1-3) of the door 102 extending outward from the face 112 of the door 102

The second hinge component 302 of FIGS. 5A-5D may similarly include a U-shaped body 500 having an elongated planar middle 502 and two planar tabs 504 extending from opposite ends of the planar middle 502. The tabs 504 are both oriented in parallel planes to each other and oriented 90 degrees from the planar middle 502. The planar tabs 504 may each have an aperture 506 formed therethrough. The apertures 506 are aligned with one another in a direction parallel to the length of the planar middle 502. As illustrated, the apertures 506 may be circular. In other embodiments, the apertures 506 may be elliptical or any other desired shape that enables a rod or similar mechanical linkage to extend therethrough. As illustrated, the planar middle 502 may include one or more fasteners 508 (e.g., studs) extending therefrom to enable coupling of the second hinge component 302 to the mounting surface (e.g., 114 of FIGS. 1 and 2). As illustrated, the fastener 508 may extend from the planar middle 502 in a direction opposite of the direction in which the planar tabs 504 extend from the planar middle 502. The planar middle 502 of the second hinge component 302 may be disposed in direct engagement with a flat surface on an outside of the mounting surface (e.g., 114 of FIGS. 1 and 2) via the fastener(s) 508 or using any other desired coupling method.

As shown in FIG. 1, the hinge assembly 110 may include a rod 512 or other mechanical linkage that extends through all four apertures 406/506 of the hinge components 300/302. The multiple hinge assemblies 110 may each include their own rod 512, as shown, or the same rod or other mechanical linkage may extend through all of the hinge assemblies 110. As illustrated in FIGS. 1, 4, and 5, the length of the planar middle 502 of the second hinge component 302 may be greater than the length of the planar middle 402 of the first hinge component 300. This enables the first hinge component 300 to slot into the second hinge component 302. In other embodiments, this may be reversed such that the planar middle 402 of the first hinge component 300 is longer than the planar middle 502 of the second hinge component 302 and the second hinge component 302 slots into the first hinge component 300.

The non-circular shape of the apertures 406 in the first hinge component 300 may enable the hinge component 300 to easily rotate with respect to the rod 512 along with the door 102 as the door 102 is opened or closed. With the door 102 in a closed position, the non-circular shape of the apertures 406 may allow the door 102 to move further in an inward direction with respect to the hinge assemblies 110 and the mounting surface 114 as fasteners 104 are tightened to secure the door 102 against the mounting surface 114. This may also help to apply a desired compression to the gasket (e.g., 208 in FIG. 3) of the door 102 as the door 102 is moved closer to the gasket. Other arrangements of the hinge assemblies 110 may be used in other embodiments.

Figure 6:
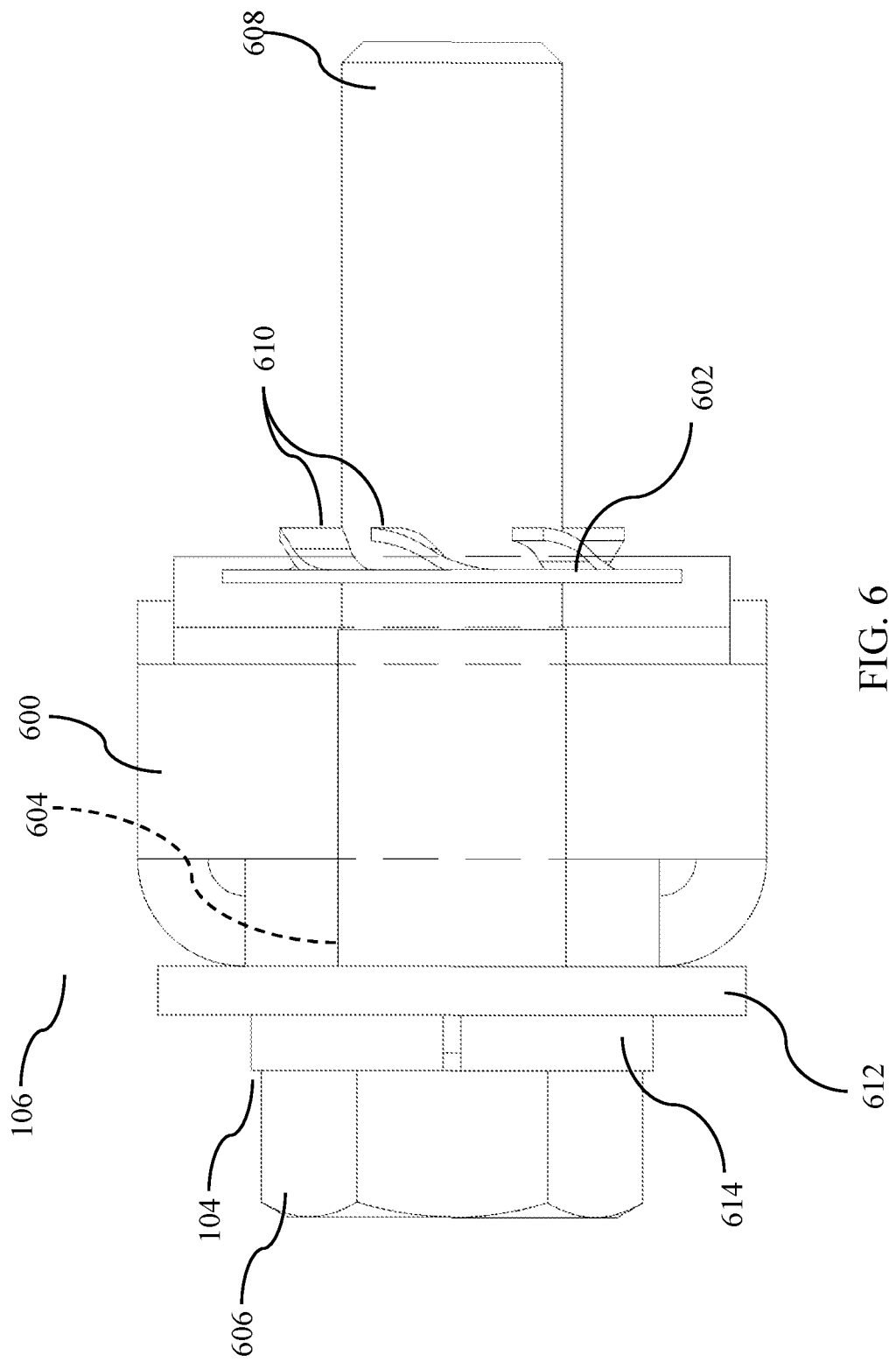
FIG. 6 is a side view of a door fastener and fastener retaining assembly with the bracket (600) made transparent, in accordance with an embodiment of the present disclosure.
Figure 7:
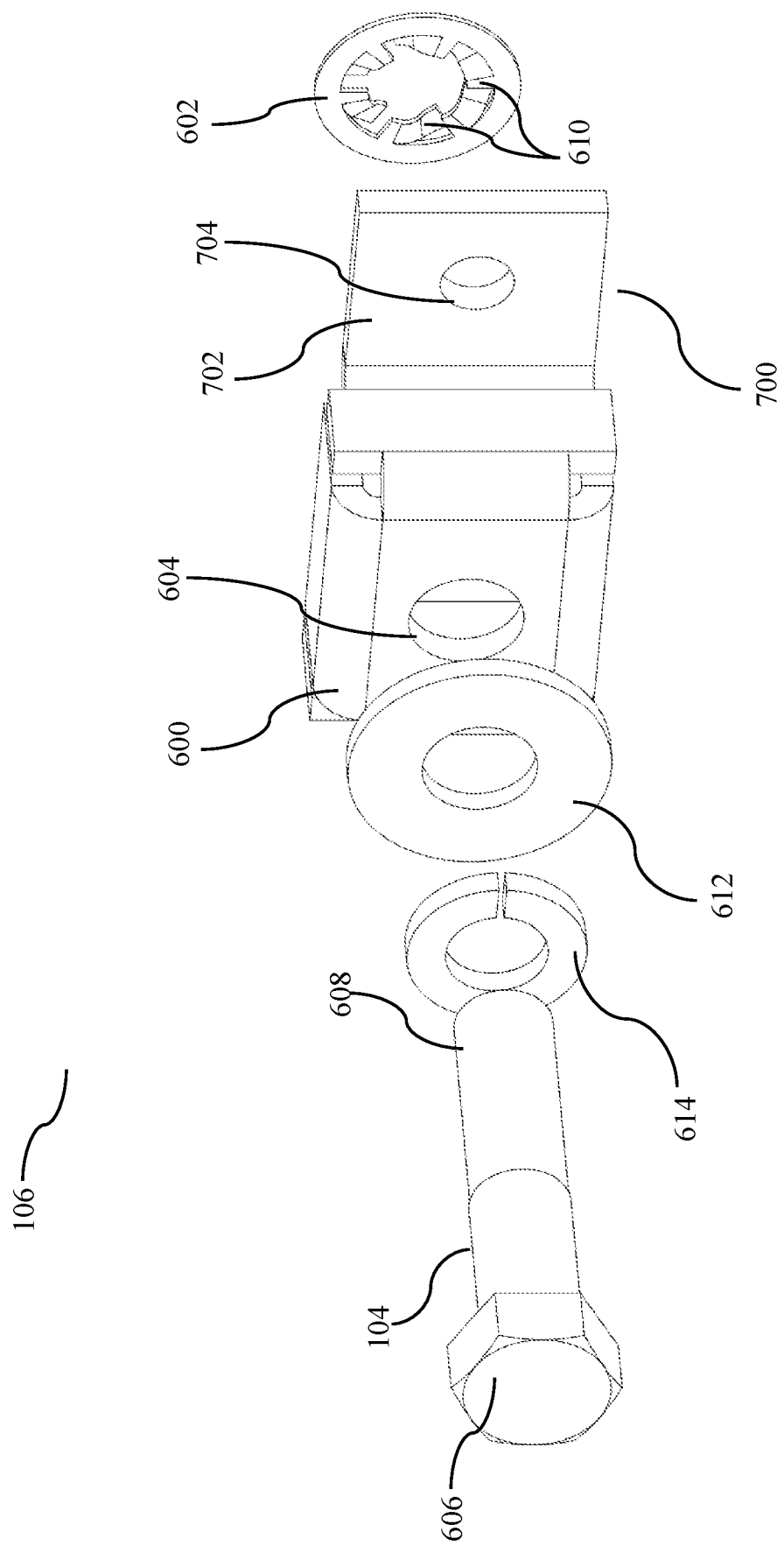
FIG. 7 is an exploded perspective view of the fastener and fastener retaining assembly of FIG. 6, in accordance with an embodiment of the present disclosure.

Having described a door assembly in which the disclosed fastener retaining assembly 106 may be used, a more detailed description will now be provided of the fastener retaining assembly 106 used to retain the fastener 104 to the door 102. FIGS. 6 and 7 illustrate an example of the disclosed fastener retaining assembly 106 along with the fastener 104 and other hardware that may be retained to the door using the fastener retaining assembly 106.

The fastener retaining assembly 106 generally comprises a bracket 600 and a retainer washer 602. The bracket 600 has an aperture 604 formed therethrough, and the fastener 104 extends through the aperture 604 in the bracket 600, as shown. The fastener 104 may also extend through the retainer washer 602, as shown in FIG. 6. As such, the retainer washer 602 may generally be disposed around the fastener 104. The bracket 600 may receive the fastener retaining assembly 106 into mounting engagement with the door (e.g., 102 of FIGS. 1 and 2), while the retainer washer 602 retains the fastener 104 to the fastener retaining assembly 106.

As illustrated, the fastener 104 may comprise a bolt. However, other types of fasteners 104 such as, for example, screws and studs, may be retained via the fastener retaining assembly 106. As shown, the fastener 104 may feature a head 606 at one end thereof. Although threads are not illustrated, the fastener 104 may generally include threads formed along the outer perimeter thereof at an end 608 of the fastener 104 opposite the head 606.

The retainer washer 602 may be disposed proximate the bracket 600. For example, the retainer washer 602 may be disposed substantially flush against an edge of the bracket 600. The retainer washer 602 may be disposed in a recess formed in the side of the bracket 600 or otherwise secured to the side of the bracket 600 opposite the head 606 of the fastener 104. The retainer washer 602 may include sloping helical teeth 610 extending in a direction away from the bracket 600. These teeth 610 may function to retain the fastener 104 (e.g., threads of the fastener 104) against the retainer washer 602 and bracket 600 such that the fastener 104 cannot be easily removed from the fastener retaining assembly 106. It should be noted that in other embodiments, the retainer washer 602 may take other forms than what is shown in the figures. For example, any type of retainer washer that is capable of retaining a bolt in place against itself may be used in the disclosed fastener retaining assembly 106. The bracket 600 acts as a wall against which the retainer washer 602 is braced so that the fastener 104 cannot be removed from the fastener retaining assembly 106.

As shown in FIG. 7, the bracket 600 may include an attachment feature 700 configured to mount the fastener retaining assembly 106 to a structure (e.g., door 102 of FIGS. 1 and 2). The attachment feature 700 may removably mount the fastener retaining assembly 106 to the structure (e.g., door 102 of FIGS. 1 and 2). The bracket 600 may be mounted directly to the door (e.g., 102 of FIGS. 1 and 2) via the attachment feature 700. As shown in FIG. 7, the attachment feature 700 may include a substantially flat ear 702 extending from a portion of the bracket 600 having the aperture 604. As illustrated, the ear 702 may have an aperture 704 formed therethrough. The direction in which the aperture 704 extends through the ear 702 may be substantially parallel to a direction in which the aperture 604 extends through a main body portion of the bracket 600. That way, both apertures 604 and 704 can each support a fastening component extending therethrough for attachment to the door. In the case of the flat ear 702, the aperture 704 formed therethrough may be positioned over a stud (shown in FIGS. 8A and 8B) extending from a sheet metal portion of the door.

Other types of fasteners (e.g., bolts or screws) may be used to attach the ear 702 to the door in other embodiments. In addition, other numbers of apertures 704 (e.g., more than one) may be formed through the ear 702 in other embodiments. In still other embodiments, the attachment feature 700 of the bracket 600 may include two flat ears 702 extending from opposite sides of the main body of the bracket 600 for mounting the bracket 600 to the door. Other numbers (e.g., three, four, or more) of ears 702 may extend from a main body of the bracket 600 to facilitate secure mounting of the bracket 600 to the door. It should be noted that other types of attachment features 700 may be used to couple the bracket 600 to the door. For example, in other embodiments, the bracket 600 may be attached to the door via one or more attachment features 700 from the list including welds, clips, adhesives, straps, press fit components, interference fit components, or combinations thereof.

In some embodiments, the attachment feature 700 may facilitate removable attachment of the bracket 600 to the mounting surface (e.g., door 102 of FIGS. 1 and 2). If the fastener retaining assembly 106 is removed from the surface to which it is removably mounted, the fastener 104 will remain attached to the fastener retaining assembly 106 via the retainer washer 602, as shown in FIG. 6.

As shown in FIGS. 6 and 7, the fastener retaining assembly 106 may retain other hardware to the door along with the fastener 104. This other hardware may include, for example, an additional washer. As such, the full assembly of FIGS. 6 and 7 may include at least one additional washer disposed around the fastener 104. The bracket 600 is disposed between the retainer washer 602 and the at least one additional washer. The illustrated embodiment includes two additional washers, a flat washer 612 and a lock washer 614, disposed around the fastener 104. However, other numbers, arrangements, and combinations of any desired types of washers or other fastener hardware may be disposed between the head 606 of the fastener 104 and the bracket 600. For example, there may be no washers present at this location in other embodiments. In other embodiments, one, three, four, five, six, seven, or more pieces of hardware may be disposed along the fastener 104. Such hardware components may include, for example, flat washers, lock washers, bevel washers, star washers, other washers, or any desired combination thereof.

Assembly of the fastener 104, associated hardware, and the fastener retaining assembly 106 may proceed as illustrated in FIG. 7. That is, the fastener 104 may be received through the associated fastening hardware (e.g., lock washer 614 and flat washer 612), the bracket 600, and finally the retainer washer 602 on the other side of the bracket 600. This fastens the door fastening hardware (104, 612, and 614) to the retaining bracket 600, creating a fastening assembly. The fastening assembly may then be attached in one piece to the door via the attachment feature 700.

Figure 8B:
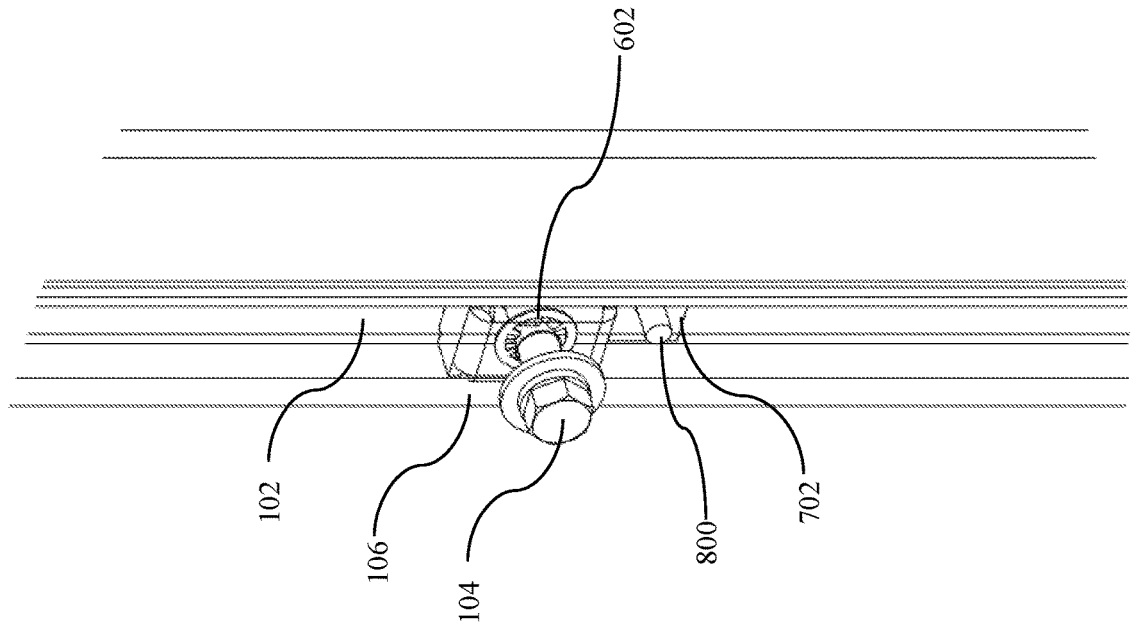
FIGS. 8A and 8B are perspective views of a fastener and fastener retaining assembly in use on a door, in accordance with an embodiment of the present disclosure.
Figure 8A:
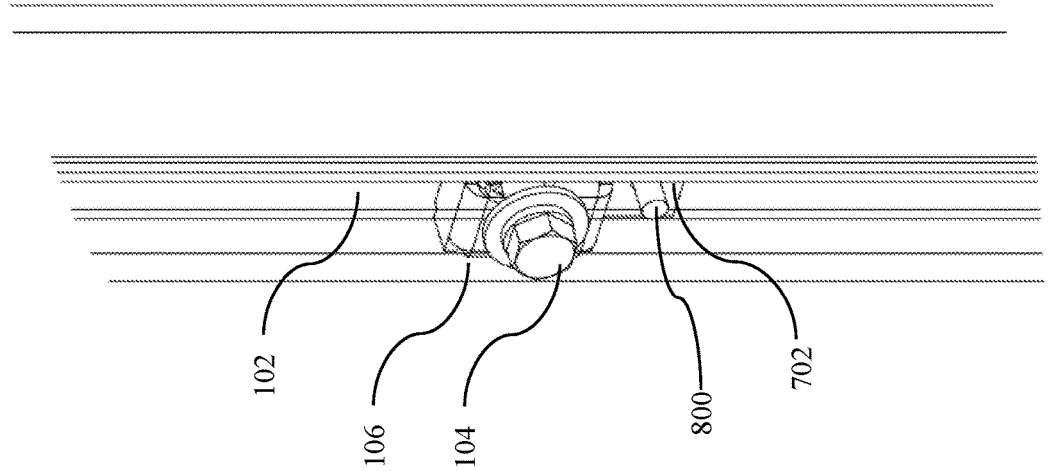

FIGS. 8A and 8B illustrate the fastener 104 and fastener retaining assembly 106 fastened to the door 102. As shown, the fastener retaining assembly 106 may be mounted to the door 102 via the aperture of the ear 702 being received onto a stud 800 extending from the door 102. With the fastening hardware now fastened to the door 102, the fastener retaining assembly 106 allows for the opening and closing of the door 102 while the fastener 104 remains attached to the door 102.

FIG. 8A illustrates the fastener retaining assembly 106 with the fastener 104 in its fully locked position. In this position, the fastener 104 secures the door 102 to its mounting surface (e.g., door frame). FIG. 8B illustrates the fastener retaining assembly 106 with the fastener 104 in its unlocked position. The fastener 104 is not fastening the door 102 to its mounting surface (e.g., door frame) in FIG. 8B. Even so, the fastener retaining assembly 106 retains the fastener 104 against the door 102 via the retainer washer 602.

Figure 9A:
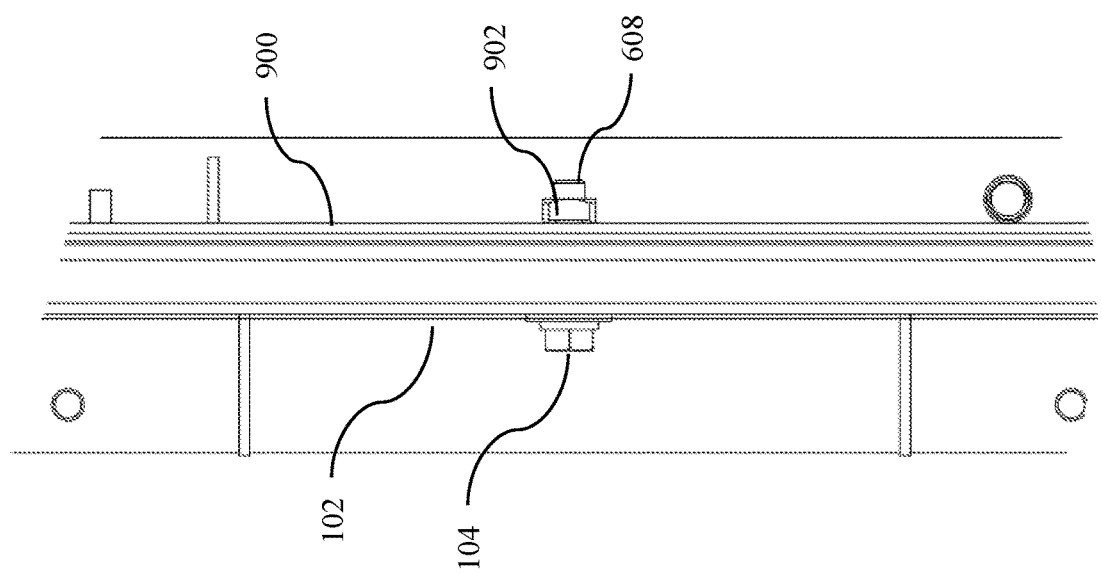

FIG. 9A illustrates a side view of the fastener 104 in its fully locked position. In this position, the fastener 104 secures the door 102 to a door frame 900. The door frame 900 may include an engagement mechanism 902 configured to mate with the end 608 of the fastener 104 when the door 102 is closed against the door frame 900. In this position the retainer washer (e.g., 602 of FIGS. 6-8) is disposed on an opposite side of the door 102 from the door frame 900, as shown in FIG. 8. The engagement mechanism 902 may generally include a nut, as shown. Securing the door 102 to the door frame 900 may include receiving the nut 902 into locking engagement with the end 608 of the fastener 104 extending from the door frame 102. As shown, the door frame 900 is located between the nut 902 and the door 102. The nut 902 may be attached to the door frame 900 so that the nut 902 is retained thereon whenever the fastener 104 is unscrewed from the nut 900 to enable opening of the door 102.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
a door;
a fastener extending at least partially through an aperture in the door;
a fastener retaining assembly comprising a bracket and a retainer washer, wherein the fastener retaining assembly is attached to the door and retains the fastener to the door, wherein the retainer washer is disposed around the fastener and disposed between the bracket and the door, and wherein the bracket is mounted directly to the door; and
a door frame, wherein the door frame comprises an engagement mechanism configured to mate with an end of the fastener when the door is closed against the door frame, wherein the retainer washer is disposed on an opposite side of the door from the door frame.

2. The system of claim 1, wherein the bracket has an aperture formed therethrough, wherein the fastener extends through the aperture in the bracket and the retainer washer.

3. The system of claim 1, wherein the fastener retaining assembly is removably attached to the door.

4. The system of claim 1, further comprising:
a plurality of fasteners including the fastener, each of the plurality of fasteners extending at least partially through a corresponding one of a plurality of apertures in the door; and
a plurality of fastener retaining assemblies including the fastener retaining, each of the plurality of fastener retaining assemblies being attached to the door and retaining a corresponding one of the plurality of fasteners to the door.

5. The system of claim 1, further comprising a hinge coupling the door to a door frame.

6. The system of claim 5, wherein the hinge comprises a slotted hinge assembly having a first hinge component attached directly to the door and a second hinge component attached directly to the door frame.

7. The system of claim 1, further comprising a gasket disposed on a face of the door, the gasket being disposed along a periphery of the face of the door.

8. The system of claim 7, wherein the gasket has an aperture aligned with the aperture in the door, wherein the fastener extends at least partially through the aperture in the gasket.

9. An assembly, comprising:
a fastener comprising a head at one end thereof; and
a fastener retaining assembly comprising:
a bracket with an aperture formed therethrough, wherein the fastener extends through the aperture in the bracket, wherein the bracket comprises an attachment feature configured to mount the fastener retaining assembly to a structure, the attachment feature comprises a substantially flat ear extending from a portion of the bracket having the aperture, the ear extends from the portion of the bracket in a direction perpendicular to a direction in which the fastener extends through the aperture in the bracket, the ear is offset from the portion of the bracket in a direction parallel to the direction in which the fastener extends through the aperture in the bracket, and the ear has a second aperture formed therethrough;
a retainer washer disposed around the fastener, wherein the retainer washer is disposed proximate the bracket; and
at least one additional washer disposed around the fastener, wherein the at least one additional washer is disposed between the head of the fastener and the bracket, and wherein the retainer washer is disposed on an opposite side of the bracket from the head of the fastener.

10. The assembly of claim 9, wherein the fastener is a bolt.

11. A method, comprising:
receiving a fastener into a fastener retaining assembly, the fastener retaining assembly comprising a bracket and a retainer washer, wherein the bracket is mounted directly to a door, the fastener is received through the retainer washer, and the retainer washer is disposed between the bracket and the door;
securing the door to a door frame via the fastener, wherein the retainer washer is disposed on an opposite side of the door from the door frame; and
retaining the fastener to the door via the fastener assembly attached to the door.

12. The method of claim 11, further comprising:
receiving the fastener retaining assembly into mounting engagement with the door via the bracket; and
retaining the fastener via the retainer washer of the fastener retaining assembly.

13. The method of claim 12, further comprising allowing removal of the fastener together with the fastener retaining assembly from the door.

14. The method of claim 11, wherein securing the door to the door frame comprises receiving a nut into locking engagement with an end of the fastener extending from the door frame, wherein the door frame is between the nut and the door.

15. The method of claim 11, further comprising sealing a periphery of the door via a gasket disposed between the door and the door frame when the door is secured to the door frame.

16. The method of claim 11, wherein the fastener assembly remains attached to the door when the door is in both an open position with respect to the door frame and a closed position with respect to the door frame.

17. The method of claim 11, comprising securing the door to the door frame via the fastener mating with an engagement mechanism of the door frame.

\* \* \* \* \*